United States Patent [19]

Iriyama et al.

[11] Patent Number: 5,448,391
[45] Date of Patent: Sep. 5, 1995

[54] OPTICAL ATMOSPHERIC LINK SYSTEM

[75] Inventors: Toshihisa Iriyama; Yujiro Ito, both of Kanagawa, Japan

[73] Assignee: Sony Corporation, Japan

[21] Appl. No.: 84,800

[22] Filed: Jun. 29, 1993

[30] Foreign Application Priority Data

Jun. 30, 1992 [JP] Japan ................. 4-196005

[51] Int. Cl.$^6$ ............................................. H04B 10/00
[52] U.S. Cl. .................................... 359/159; 359/169; 359/172
[58] Field of Search ............... 359/109, 143, 182, 189, 359/168–170, 172; 250/201.1, 203.3; 356/138, 129.1, 152.1, 153

[56] References Cited

U.S. PATENT DOCUMENTS

| | | | |
|---|---|---|---|
| 3,504,182 | 3/1970 | Pizzurro et al. | 250/199 |
| 3,511,998 | 5/1970 | Smokler | 455/606 |
| 3,566,126 | 2/1971 | Lang | 250/199 |
| 3,828,185 | 8/1974 | Vandling | 250/199 |
| 3,981,566 | 9/1976 | Frank et al. | 359/214 |
| 3,990,796 | 11/1976 | Foltz, Jr. | 356/152 |
| 4,074,312 | 2/1978 | Van Rosmalen | 359/159 |
| 4,867,560 | 9/1989 | Kinitsugu | 319/159 |
| 5,065,455 | 11/1991 | Ito et al. | 359/159 |
| 5,142,400 | 8/1992 | Solinsky | 359/170 |
| 5,221,985 | 6/1993 | Ito | 259/154 |
| 5,237,166 | 8/1993 | Ito et al. | 250/201.1 |

FOREIGN PATENT DOCUMENTS 1234997  6/1971  United Kingdom ........... H01S 3/10

OTHER PUBLICATIONS

W. Auer, "Pointing, Acquistion and Tracking for Intersatellite Optical Data Links," Proc. ESA Workshop on Spacer Laser, Applications and Technology, Les Diablerets, Mar. 1984, pp. 131–136 and 2 figures.

*Primary Examiner*—David K. Moore
*Assistant Examiner*—Kinfe-Michael Negash
*Attorney, Agent, or Firm*—Limbach & Limbach; Alan S. Hodes

[57] ABSTRACT

An optical atmospheric link device which is adapted to quickly correct the incident position of a light beam with high follow-up accuracy. Incident position detection signals are generated by an optical beam incident position detector in correspondence to the incident position of a first optical beam. The incident position detection signal along with a reference incidence position signal, are utilized to generate incident position correcting signal. The incident position correcting is utilized to move a lens to quickly correct the incident position in a small amplitude mode. Furthermore, a displacement detection signal is generated which corresponds to the displacement of the lens. The displacement detection signal and the incident position correcting signal are utilized to move a pair of mirrors to slowly correct the incident position in a large amplitude mode.

10 Claims, 2 Drawing Sheets

OPTICAL ATMOSPHERIC LINK SYSTEM

BACKGROUND OF THE INVENTION

1. Field of the Invention

This invention relates to an optical atmospheric link system, and more particularly to an optical atmospheric link devices which irradiate optical beams in atmosphere to transmit desired data therebetween.

2. Description of the Prior Art

Heretofore, an optical atmospheric link system for irradiating optical light beams in the atmosphere to transmit desired data was provided. Two such optical atmospheric link devices may be installed on the roofs of buildings which are spaced, for example, several kilo-meters [km] from each other, and desired data transmitted therebetween.

In order to transmit data correctly between the two optical atmospheric link devices, an optical beam irradiated from a signal transmitting device of each of the apparatus should be correctly applied to a signal receiving device of the other. In a typical optical atmospheric link system, the optical systems within the signal transmitting device and the signal receiving device have a correcting optical device, including a mirror and a convex lens. The mirror and the convex lens are moved suitably to adjust the direction of radiation (i.e., position of incidence) of the light beam.

Hence, in installation of the optical atmospheric link devices, the devices are first roughly positioned, using a telescope or the like. Thereafter, an optical beam is transmitted through the atmosphere from one of the devices to the other. Then, the mirrors and a convex lens as in the devices are adjusted such that the signal receiving device receive the light beam correctly. This adjusting operation is carried out for the two devices alternately and repeatedly, until the optical beam is transmitted in a correct direction and is received at a correct position.

However, the optical axis may be shifted by external disturbances such as wind and vibration. Therefore, the signal receiving device is provided with an incident position correcting servo system which monitors the position of incidence of the optical beam transmitted from the signal transmitting device of the other optical atmospheric link device at all times and, when the position of incidence is shifted, drives the mirror and the convex lens to correct it.

In the incident position correcting servo system, the mirror is used to deflect the reflected optical axis in a predetermined direction. The mirror movement is driven, for instance, by a piezo-electric actuator. Furthermore, the convex lens is moved in a direction substantially perpendicular to the optical axis, so as to deflect the optical axis in a predetermined direction. The lens movement is driven by a plurality of electric motors.

In the incident position correcting servo device, the mirror is driven by the piezo-electric actuator in a high response mode; however, since the actuator is small in vibration amplitude, the amount of displacement of the mirror is small. Hence, if the mirror is displaced from the center of displacement only in one direction, then the direction of displacement which can be controlled is limited, as a result of which the shift in the position of incidence by an external disturbance cannot be corrected.

On the other hand, the convex lens, being driven in a large amplitude mode by the motor, can respond to larger magnitude disturbances; however, it cannot respond to a disturbance quickly because the motor itself is low in response characteristic. Even if the mirror and the convex lens are operated in combination, each performs its control operations independently of the other, and therefore the incident position correcting servo device is still insufficient in practical use.

SUMMARY OF THE INVENTION

In view of the foregoing, an object of this invention is provide an optical atmospheric link device which corrects the position of incidence of the optical transmission beam quickly and with high follow-up accuracy.

The foregoing object and other objects of the invention have been achieved by the provision of an optical atmospheric link device 1 which transmits a first transmitting optical beam LA1 modulated with a predetermined data signal to a signal receiving unit of another optical atmospheric link device spaced a predetermined distance therefrom through first correcting optical systems 7 and 8 which quickly correct an irradiation position in a small amplitude mode and a second correcting optical system 9 which slowly corrects the irradiation position in a large amplitude mode, and receives a second transmitting optical beam LA2 irradiated by the signal transmitting and receiving unit through the second and first correcting optical systems 9, 8 and 7, to receive a predetermined data signal which is transmitted on the second transmitting optical beam LA2 from the signal transmitting and receiving unit; which, according to the invention, comprises:

light beam incident position detecting means 16 for detecting the incident position of the second transmitting optical beam LA2 to output incident position detection signals PDX and PDY;

correcting signal generating means 21 for producing, according to the incident position detection signals PDX and PDY and a reference incident position signal REFX, an incident position correcting signal ERX adapted to drive the first and second correcting optical systems 7, 8 and 9;

first correcting optical system drive means 7A and 8A for driving the first correcting optical systems 7 and 9 according to the incident position correcting signal ERX, to correct the incident position;

displacement detecting means 7B for detecting the displacement of the first correcting optical systems 7 and 8, to output a displacement detection signal MAX; and second correcting optical system drive means 9A and 9B for driving the second correcting optical system 9 according to the incident position correcting signal ERX and the displacement detection signal MAX, to correct the incident position.

The incident position correcting signal ERX is produced according to the incident position detection signals PDX and PDY outputted by the optical beam incident position detecting means 16 in correspondence to the incident position of the second transmitting optical beam LA2, and the reference incident position signal REFX. The incident position correcting signal ERX is utilized to drive the first correcting optical systems 7 and 8 adapted to quickly correct the irradiation position in a small amplitude mode, thereby to correct the incident position. Furthermore, the displacement detection signal HAX corresponding to the displacement of the first correcting optical systems 7 and 8, and the incident position correcting signal ERX are utilized to drive the second correcting optical system 9 adapted to slowly correct the incident position in a large amplitude mode, to correct the incident position. Thus, the high responsibility of the first correcting optical systems 7 and 8, and the large amplitude mode of the second correcting optical system 9 are utilized in combination for correction of the incident position; that is, the incident position of the second transmitting light beam LA2 can be corrected quickly with high follow-up accuracy.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiment of this invention will be described with reference to the accompanying drawings:

(1) Constitution of an Optical Atmospheric Link Device

Figure 1:
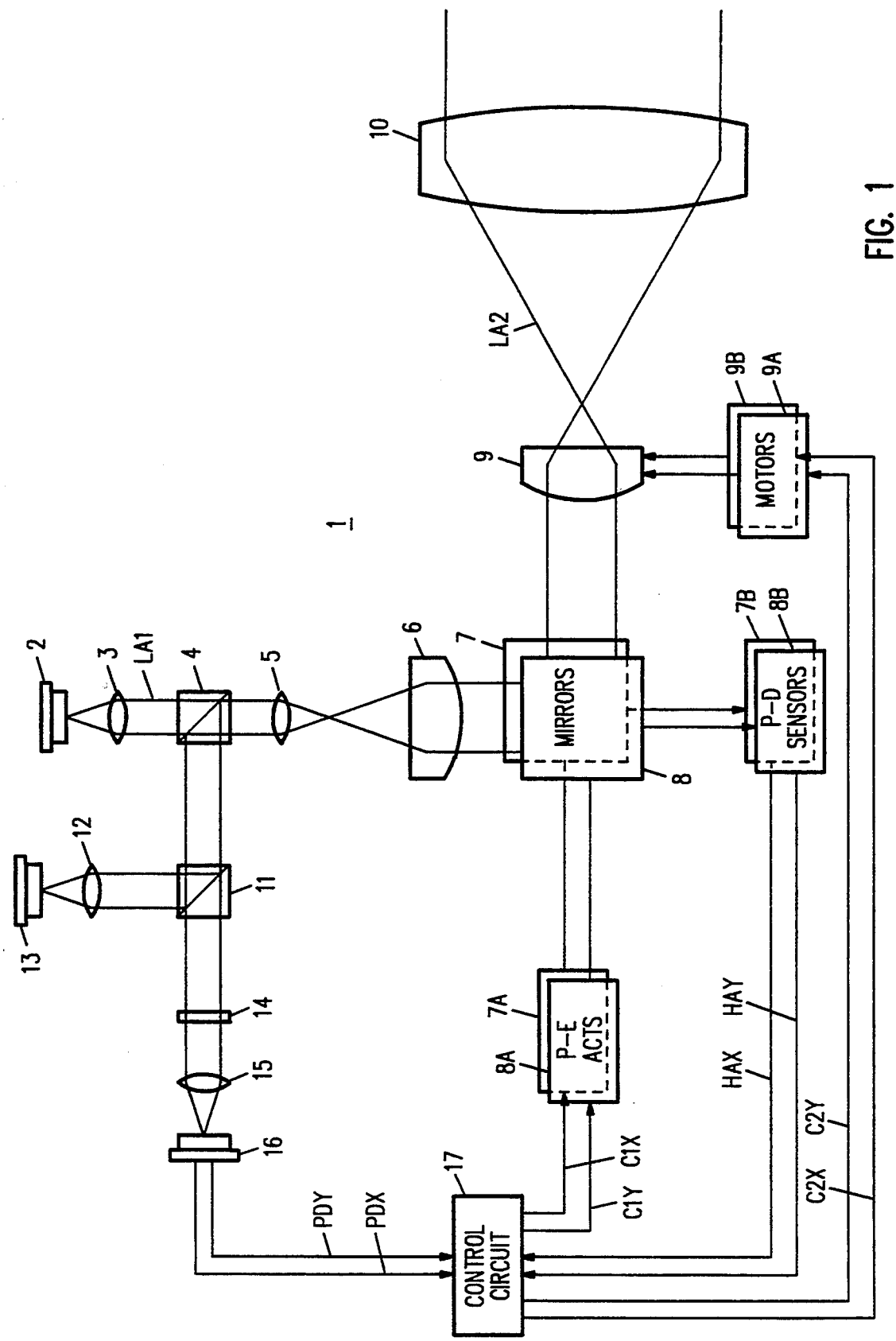
FIG. 1 is a schematic diagram showing the configuration of an optical atmospheric link device of one embodiment of this invention.

In FIG. 1, reference numeral 1 shows the whole arrangement of an optical atmospheric link device, which constitutes a first embodiment of the invention. In the device, a laser diode 2 is driven with a predetermined data signal, to output a transmitting optical beam LA1 having a predetermined plane of polarization, which is applied to a lens 3. This lens 3 converts the transmitting optical beam LA1 into a parallel light beam, which is applied through a polarizing beam splitter 4 to a lens 5. The lens 5 changes the transmitting optical beam LA1 into a convergent optical beam which is applied to a lens 6. The lens 6 converts the convergent optical beam into a parallel optical beam having a predetermined width, which is applied to a mirror 7.

The mirror 7 is positioned in parallel with another mirror 8. Those mirrors 7 and 8 form about 45° with the optical path of the transmitting optical beam LA1. The angle of inclination of the mirrors 7 and 8 can be adjusted with a predetermined drive system comprising piezo-electric actuators 7A and 8A. In the optical atmospheric link device 1, the optical axis is refracted about 90° by reflecting the transmitting optical beam LA1 with the mirrors 7 and 8; that is, the angle of inclination of the mirror 7 and 8 is adjusted to change the direction of irradiation of the transmitting optical beam LA1.

The transmitting optical beam LA1 thus reflected by the mirrors 7 and 8 is applied to a convex lens 9. The lens 9 can be displaced in a direction perpendicular to the axis by predetermined motors 9A and 9B. Thus, in the optical atmospheric link device, the lens 9 is displaced to greatly change the position of incidence of the transmitting optical beam LA1. The optical beam LA1 thus processed is applied to a lens 10.

The lens 10 is a convex lens having a large diameter, and it is spaced a predetermined distance from the convex lens 9, so that the transmitting light beam LA1 concentrated by the convex lens 9 is converted substantially into a parallel optical beam having a predetermined width. Thus, the transmitting optical beam LA1 outputted through the lens 10 is applied to a transmission object, so that a desired data signal is transmitted on the transmitting optical beam.

In the case of the optical atmospheric link device, a receiving optical beam LA2 from the transmission object is concentrated by the lens 10, then converted into a parallel optical beam by the lens 9. The parallel optical beam is reflected by the mirrors 8 and 7, and applied through the lenses 6 and 5 to the polarizing beam splitter 4. The receiving optical beam LA2 is transmitted from the transmission object in such a manner that its plane of polarization is perpendicular to the plane of polarization of the transmitting optical beam LA1. The optical beam is reflected by the polarizing beam splitter 4, so that it is applied to a beam splitter 11.

A part of the receiving optical beam LA2 is reflected by the beam splitter 11, and focused on a photo-diode 13 through a lens 12. As a result, the photo-diode 13 provides an output signal. The output signal of the photo-diode 13 is processed by a predetermined signal processing circuit (not shown), so that the data signal provided by the transmission object is received. On the other hand, the remaining of the receiving optical beam LA2, which has passed through the beam splitter 11, is applied through a filter 14 to a lens 15 so that it is focussed on a position detecting sensor (PDS) 16.

Thus, in the optical atmospheric link device 1, the angle of inclination of the mirrors 7 and 8 and the position of the lens 9 are controlled according to the output signal of the position detecting sensor 16, whereby the position of incidence of the receiving optical beam LA2 is corrected as a whole; that is, an incident position correcting servo system is formed. Thus, even when the device i is vibrated for instance by wind, the transmitting optical beam LA1 can be positively applied to the transmission object.

(2) Incident Position Correcting Servo System in an Embodiment

In the embodiment, the position detecting sensor 16 two-dimensionally detects an amount of shift of the optical axis in a plane perpendicular to the optical axis, and applies it as a X-direction position detection signal PDX and a Y-direction position detection signal PDY to a control circuit 17 comprising a micro-computer.

The control circuit 17 compares the position detection signals PDX and PDY with reference position signals REFX and REFY to produce incident position correcting signals ERX and ERY, respectively. Those incident position correcting signals are applied, as piezo-electric actuator drive signals C1X and C1Y, to the piezo-electric actuators 7A and 8A adapted to drive the mirrors 7 and 8, respectively.

The displacements of this mirrors 7 and 8 are detected by position detecting sensors 7B and 8B, which output detection signals, namely, displacement signals HAX and HAY, respectively. Those displacement signals MAX and HAY are applied to the control circuit 17. The control circuit 17 utilizes the incident position correcting signals ERX and ERY and the displacement signals HAX and MAY to produce motor drive signals C2X and C2Y respectively, which are applied to the motors 9A and 9B adapted to drive the convex lens 9.

Figure 2:
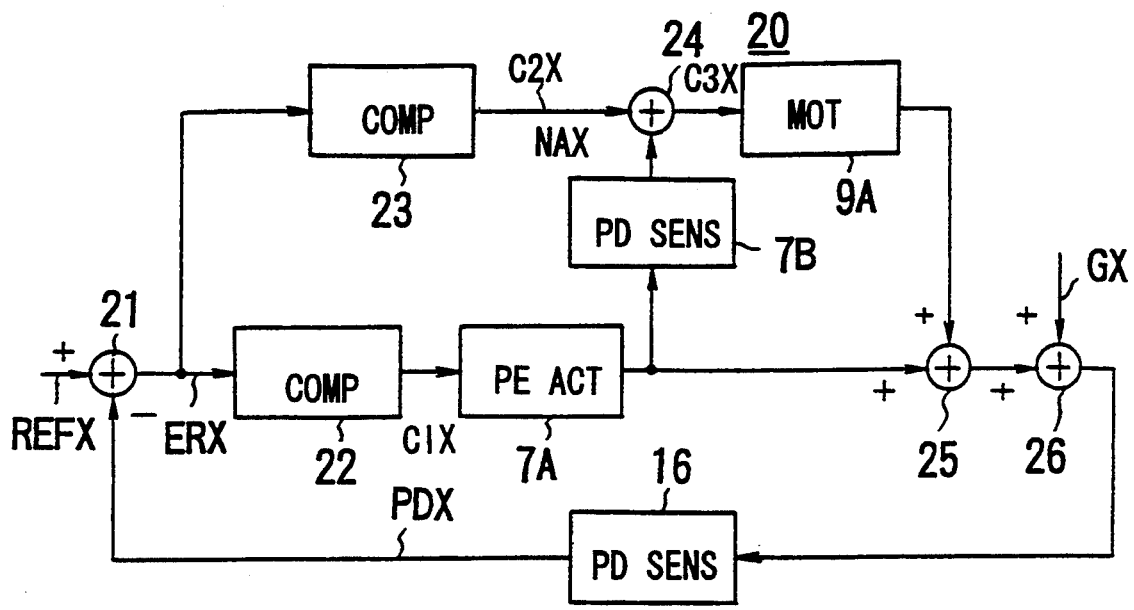
FIG. 2 is a connection diagram for illustrating an equivalent circuit explaining the description of a servo control shown in FIG. 1.

What is described above is an incident position correcting servo circuit 20, which may be represented by an equivalent circuit diagram of FIG. 2 with respect to its operations in the X-direction. That is, the reference position signals REFX, and the position detection signal PDX outputted by the position detecting sensor 16 are applied to subtraction circuit 21, which outputs the difference between the two signals, namely, the incident position correcting signal ERX. The latter ERX is applied to first and second compensating circuits 22 and 23, where it is phase-compensated as much as the servo loop.

The first compensating circuit 22 outputs the piezo-electric actuator drive signal C1X, which is applied to the piezo-electric actuator 7A to displace the mirror 7. The displacement of the mirror 7 is detected by the position detecting sensor 7B, which outputs a detection signal, namely, the displacement signal HAX. The latter HAX is applied to a first addition circuit 24, where it is added to the incident position correcting signal C2X outputted by the second compensating circuit 23. The output of the first addition circuit 24 is applied, as the motor drive signal C3X, to the motor 9A.

The displacement resulting from the control of the mirror 7 and the motor 9 are subjected to addition in a second addition circuit 25. The output of the latter 25 is applied to a third addition circuit 26, where it is added to the external disturbance GX. The output of the third addition circuit 26 is fed back to the position detecting sensor 16. Thus, the incident position correcting circuit 20 has been completed.

Figure 3:
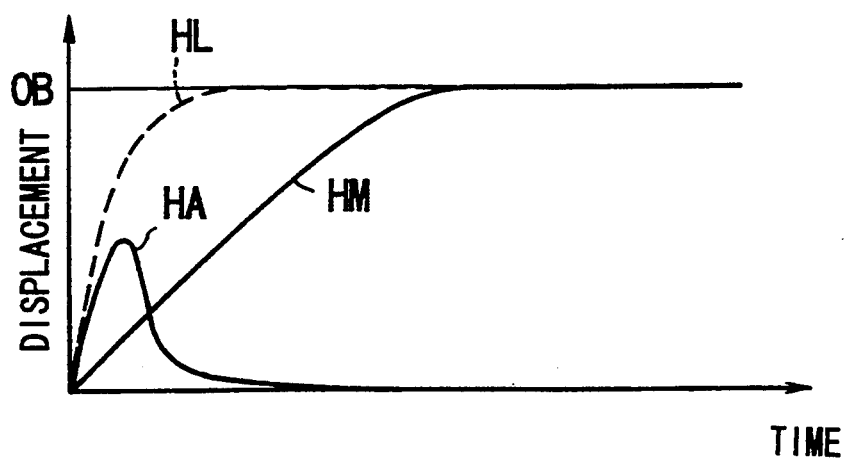
FIG. 3 is a characteristic curve explaining the description of the displacements of a convex lens and a mirror during the servo control shown in FIG. 1.

When the external disturbance GX is applied to the optical atmospheric link device 1 designed as described above, the operations of the piezo-electric actuator 7A and the motor 9A are as shown in FIG. 3. The piezo-electric actuator 7A starts its operation quickly, while the motor 9A starts its operation slowly.

In the embodiment, the motor drive signal C3X applied to the motor 9A is the position voltage of the piezo-electric actuator 7A, so that the speed of the motor 9A can be changed in association with the operation of the piezo-electric actuator 7A; that is, the piezo-electric actuator 7A is prevented from being vibrated to the maximum amplitude.

The piezo-electric actuator 7A is distorted depending on the voltage; that is, the error voltage decreases as the motor is driven. Therefore, the piezo-electric actuator returns the original displacement center as the aimed value is obtained.

As indicated by the broken line in FIG. 3, the sum of the displacement HA of the piezo-electric actuator 7A and the displacement HM of the motor 9A corresponds to the response characteristic of the incident position correcting servo circuit 20. As is seen from the response characteristic, the time required for reaching the target value is shorter than in the case where only one actuator is employed; that is, the follow-up speed is increased as much.

As was described above, the error voltages are applied to the piezo-electric actuator 7A and the motor 9A. Hence, even if one of the actuators does not work, the other actuator operates to perform the follow-up operation. This means that the device is high in reliability.

In summary, the incident position correcting signal ERX is produced according to the incident position detection signals PDX and PDY outputted by the position detecting sensor 16 in correspondence to the incident position of the second transmitting optical beam LA2, and the reference incident position signal REFX; and the incident position correcting signal ERX is utilized to drive the mirrors 7 and 8 thereby to correct the incident position; and the displacement detection signal corresponding to the displacement of the mirrors 7 and 8 and the incident position correcting signal ERX are utilized to drive the convex lens 9 thereby to correct the incident position. Thus, the optical atmospheric link device 1 is able to correct the incident position of the second transmitting light beam LA2 quickly with high follow-up accuracy.

(3) Other Embodiments

In the above-described embodiment, the position detecting sensor is of two-dimensional type that light is focused on the light receiving surface; however, the invention is not limited thereto or thereby. For instance, one-dimensional position detecting sensors may be used in combination.

Furthermore, in the above-described embodiment, the piezo-electric actuators and the motors are operated to move the mirrors and the convex lens, respectively, thereby to correct the incident position of the optical beam LA2; however, the invention is not limited thereto or thereby. That is, the technical concept of the invention can be widely applied to means for correcting the incident position of an optical beam by using in combination a correcting optical system which is high in responsibility and operates in a small amplitude mode, and a correcting optical system which is low in responsibility and operators in a large amplitude mode.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An optical atmospheric link device, comprising:
   a) a lens to receive a first light beam and to transmit said light beam therethrough;
   b) mirror means for receiving said transmitted light beam and for reflecting said transmitted light beam;
   c) position determining means coupled to receive the transmitted, reflected, light-beam and for producing a position error signal responsive thereto;
   d) lens shifting means for shifting said lens in a direction perpendicular to the received light beam;
   e) mirror rotating means for shifting a position of said mirror means to change a direction of reflection of said transmitted light beam;
   f) first control means for receiving said position error signal and for producing a mirror positioning signal responsive thereto, wherein said motor rotating means rotates said mirror means responsive to said mirror positioning signal;
   g) mirror position detecting sensors for detecting a position of said mirror means and for producing a mirror position signal responsive thereto; and
   h) second control means for receiving said position error signal and said mirror position signal and for producing a lens positioning signal responsive thereto, wherein said lens shifting means shifts said lens responsive to said lens positioning signal.

2. The optical atmospheric link device of claim 1, wherein said mirror rotating means is characterized by a first response characteristic and said lens shifting means is characterized by a second response characteristic, and wherein said first response characteristic is greater than said second response characteristic.

3. The optical atmospheric link device of claim 2, wherein said mirror rotating means operates in a low amplitude mode and wherein said lens shifting means operates in a high amplitude mode.

4. The optical atmospheric link device of claim 1, further comprising:
light source means for generating a second optical beam and for transmitting said second optical beam via said mirror means and said lens.

5. An optical atmospheric link device, comprising:
a) a first correcting optical system;
b) a second correcting optical system;
c) light beam incident position detecting means for receiving a first light beam via said first and second correcting optical systems, respectively, for detecting an incident position of said first light beam, and for generating an incident position signal responsive to said detected incident position;
d) first positioning means for changing a position of said first correcting optical system;
e) second positioning means for changing a position of said second correcting optical system;
f) first control means for receiving said incident position signal and for producing a first control signal responsive thereto, wherein said first positioning means changes the position of said first correcting optical system responsive to said first control signal;
g) first correcting optical system position detecting sensors for detecting the position of said first correcting optical means and for producing a first correcting optical position signal responsive thereto; and
h) second control means for receiving said incident position signal and said first correcting optical position signal and for producing a second control signal responsive thereto, wherein said second positioning means changes the position of said second correcting optical system responsive to said second control signal.

6. The optical atmospheric link device of claim 5, wherein said first positioning means is characterized by a first response characteristic and said second positioning means is characterized by a second response characteristic, and wherein said first response characteristic is greater than said second response characteristic.

7. The optical atmospheric link device of claim 6, wherein said first positioning means operates in a low amplitude mode and wherein said second positioning means operates in a high amplitude mode.

8. The optical atmospheric link device of claim 6, wherein said first positioning means operates in a high amplitude mode and wherein said second positioning means operates in a low amplitude mode.

9. The optical atmospheric link device of claim 5, wherein said first positioning means is characterized by a first response characteristic and said second positioning means is characterized by a second response characteristic, and wherein said second response characteristic is greater than said first response characteristic.

10. The optical atmospheric link device of claim 5, further comprising:
light source means for generating a second optical beam and for transmitting said second optical beam via said second and first correcting optical systems, respectively.

* * * * *